United States Patent
Garmas

(12) 
(10) Patent No.: US 6,397,687 B1
(45) Date of Patent: Jun. 4, 2002

(54) WATER USAGE MONITOR AND REGULATOR

(76) Inventor: Jesus Garmas, 4901 SW. 98th Ave. Rd., Miami, FL (US) 33165

( * ) Notice: Subject to any disclaimer, the term of this patent is extended or adjusted under 35 U.S.C. 154(b) by 0 days.

(21) Appl. No.: 09/482,281

(22) Filed: Jan. 13, 2000

(51) Int. Cl.[7] .............................. G01F 1/05; G01F 7/00
(52) U.S. Cl. ..................... 73/861.79; 73/195; 137/49; 137/119.07; 210/88; 222/20
(58) Field of Search .................. 73/861.79, 861.82, 73/861.84, 861.77, 195, 196, 197; 137/49, 814, 119.07, 101.21, 499, 625.3; 210/88; 222/20

(56) References Cited

U.S. PATENT DOCUMENTS

| | | | |
|---|---|---|---|
| 3,097,762 A | 7/1963 | Charnota et al. | 210/88 |
| 4,023,708 A | 5/1977 | Fornasari | 222/20 |
| 4,429,571 A * | 2/1984 | Kullmann et al. | 73/197 |
| 4,708,264 A | 11/1987 | Bruninga | 222/20 |
| 4,769,135 A | 9/1988 | Norton | 222/20 |
| 5,000,041 A * | 3/1991 | Miyamoto et al. | 73/861.77 |
| D349,252 S | 8/1994 | Hurd | D10/96 |
| 5,811,674 A * | 9/1998 | McCormick | 73/196 |
| 6,026,682 A * | 2/2000 | McCormick | 73/196 |

FOREIGN PATENT DOCUMENTS

WO    WO 92/21903    12/1992

* cited by examiner

*Primary Examiner*—Harshad Patel

(57) ABSTRACT

A water monitoring and regulation apparatus comprising two vanes connected to two flow meters, a timer, a main gear connected to the two vane shafts, a timer gear connected to the timer, a shut off mechanism, a manual reset and an automatic reset when the shut off has not been engaged. The flow of water through the vanes causes the main gear to turn which causes the timer gear to turn. When the timer gear has turned the number of revolutions corresponding to the pre-selected maximum flow time, the timer will shut off the flow of water. When the water flow is interrupted, as in normal use of the water supply, the time will be automatically reset by the reset mechanism.

11 Claims, 5 Drawing Sheets

WATER USAGE MONITOR AND REGULATOR

BACKGROUND OF THE INVENTION

1. Field of the Invention

The present invention relates to an apparatus for monitoring the amount of water drawn from a source pipeline and for shutting off the flow of water when the amount of water drawn exceeds a predetermined limit.

2. Description of the Prior Art

Flow regulators and metering devices are commonly used to regulate the amount of water used in a sprinkling system, to shut off the flow of liquid after a predetermined amount of fluid has passed, and to shut off the flow as a safety device when the flow exceeds normal limits. For example, U.S. Pat. No. 4,769,135 discloses a metering device having vanes turned by the liquid which drive a gear so that once the vane has rotated a selected number of times, as a result of the fluid flow, the rotation of the gear will break a frangible line causing the flow to stop. U.S. Pat. No. 4,708,264 discloses a water driven impeller and speed reducer that determines the open time of a valve member.

SUMMARY OF THE INVENTION

The present invention meets the needs and solves the problems identified above by providing an apparatus for automatically closing a valve on a water line when water has been flowing through the line for longer than a preselected time period. The apparatus comprises two vanes connected to two flow meters, a timer, a main gear connected to the two vane shafts, a timer gear connected to the timer, a shut off mechanism, a manual reset and an automatic reset when the shut off has not been engaged. The flow of water through the vanes causes the main gear to turn which causes the timer gear to turn. When the timer gear has turned the number of revolutions corresponding to the pre-selected maximum flow time, the timer will shut off the flow of water. When the water flow is interrupted, as in normal use of the water supply, the time will be automatically reset by the reset mechanism.

The foregoing and other objects, features and advantages of the invention will be apparent from the following more particular description of a preferred embodiment of the invention, as illustrated in the accompanying drawings wherein like reference numbers represent like parts of the invention.

BRIEF DESCRIPTION OF THE DRAWINGS

FIG. 4 is a cross sectional view along line 4—4 of FIG. 3.

DESCRIPTION OF PREFERRED EMBODIMENTS

Figure 1:
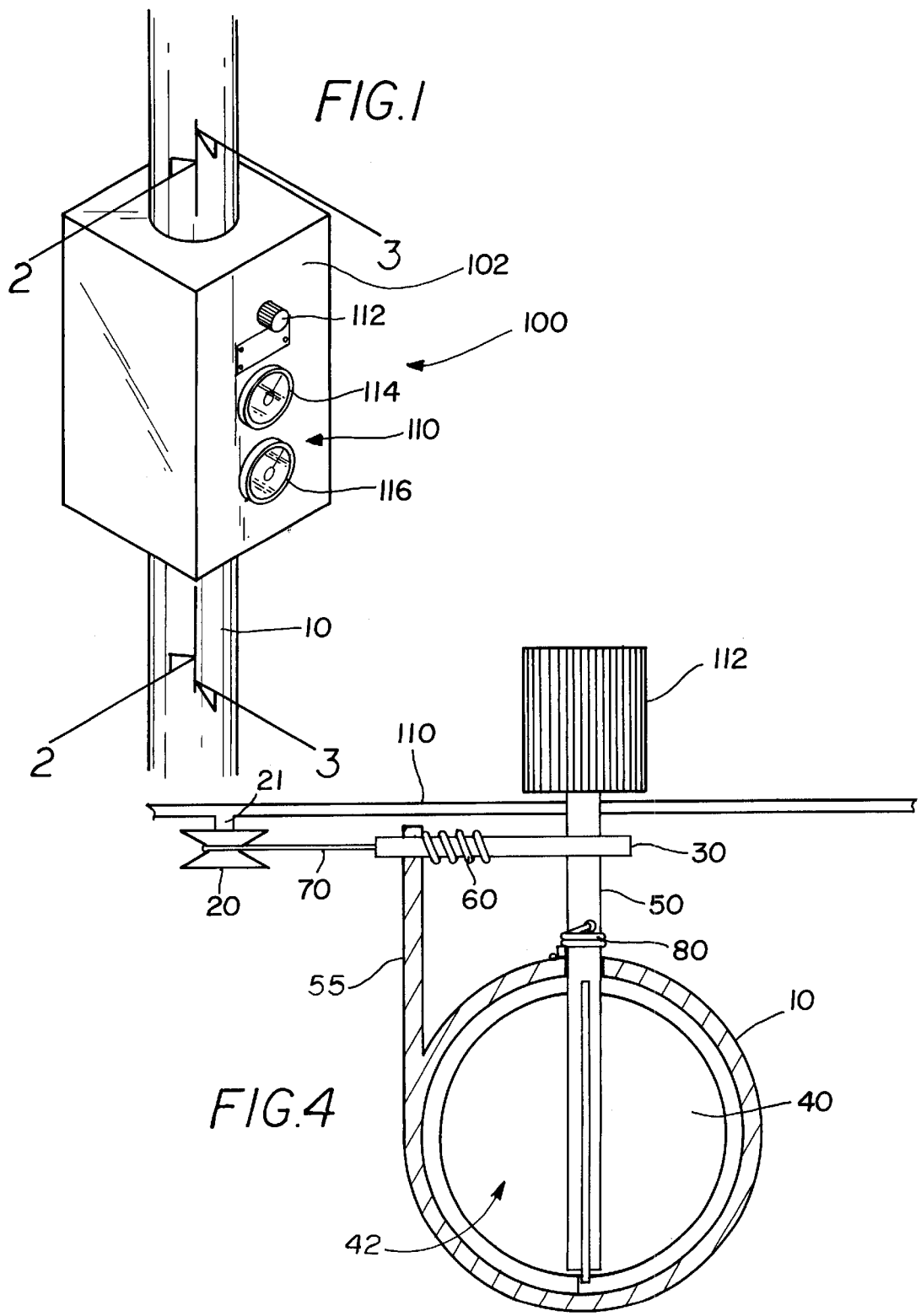
FIG. 1 is a side perspective drawing of the apparatus affixed to a pipe.

In FIG. 1 Water regulator 100 is shown with housing 110 affixed to pipe 10. Housing 110 has, knob 112, first meter 114 and second meter 116. Face 102 of housing 110 maybe hinged (not shown) for access to interior of housing 110.

Figure 2:
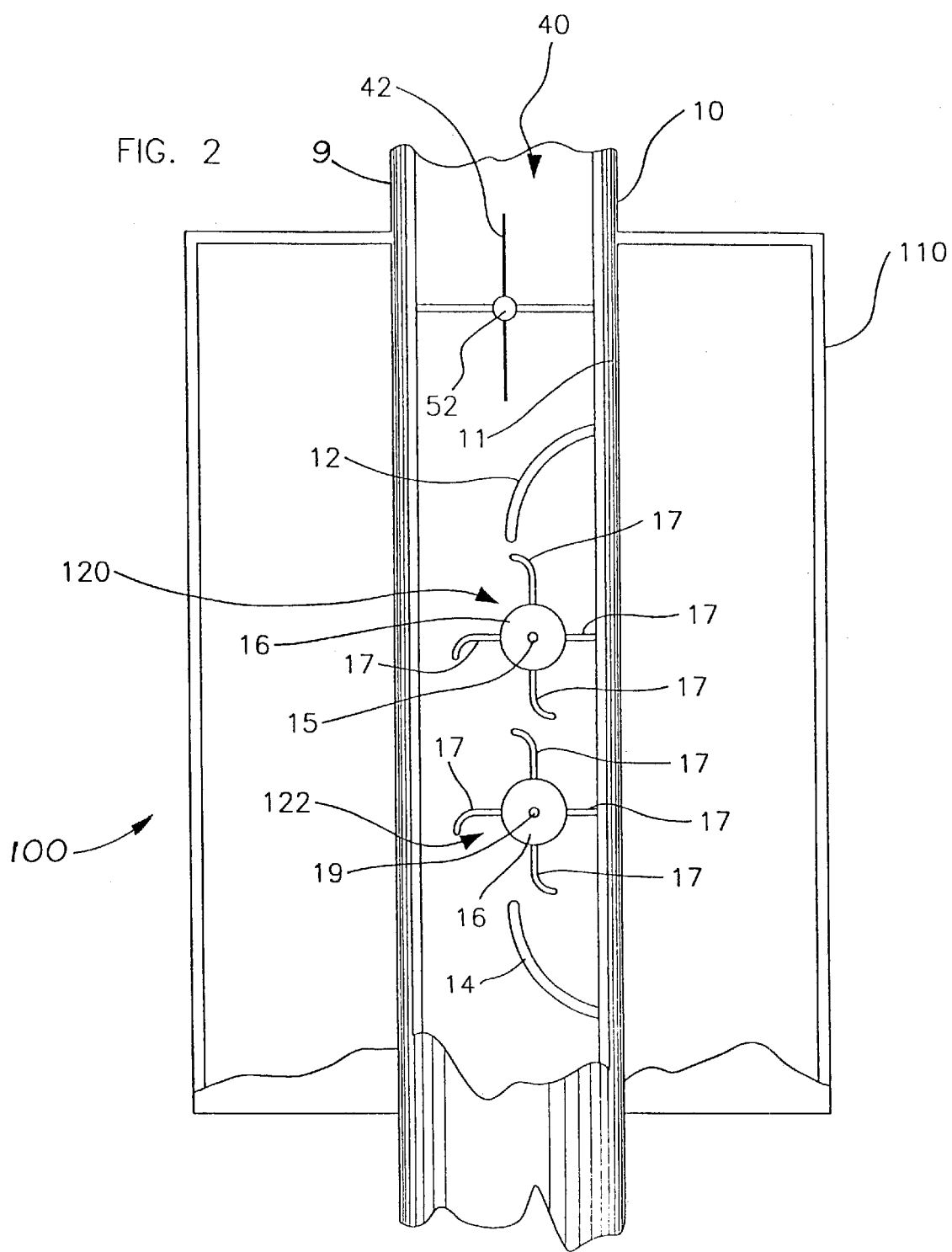
FIG. 2 is a cross sectional view along line 2—2 of FIG. 1.

FIG. 2 shows a cross sectional view of water regulator 100 along line 2—2 of FIG. 1. Housing 110 is fixedly engaged to pipe 10. Pipe 10 has valve element 40. Valve element 40 has valve 42 and valve spindle 52. Valve spindle 52 is rotatably engaged to interior wall 11 of pipe 10. Valve 42 is shown in the open position in which valve 42 is parallel to the sides of pipe 10. Pipe 10 has first shield 12 and second shield 14 fixedly engaged to the interior wall 11 of pipe 10. Water regulator 100 has first impeller 120 and second impeller 122. First impeller 120 has a plurality of vanes 17, impeller disk 16 and first impeller shaft 15. Second impeller 122 has vanes 17, impeller disk 16 and second impeller shaft 19. First impeller shaft 15 and second impeller shaft 19 are rotatably mounted through interior wall 11 and exterior wall 9 of pipe 10. First shield 12 and second shield 14 guard first impeller 120 and second impeller 122 respectively and direct the flow of water over vanes 17 as they rotate about impeller disks 16. The direction of flow of water in pipe 10 is from second shield 14 towards first shield 12 so that vanes 17 will catch the flow in the downward curving end portions of vanes 17.

Figure 3:
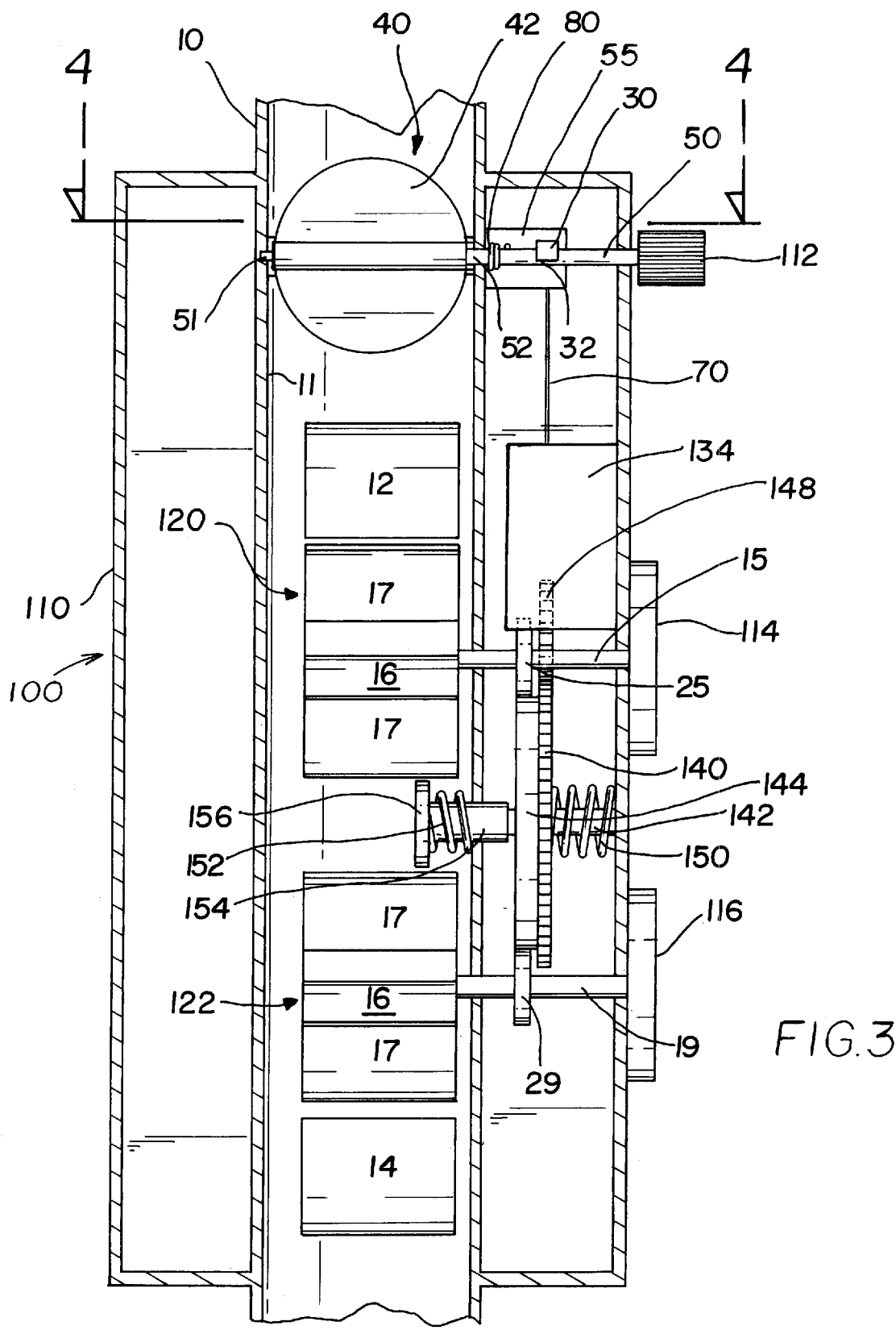
FIG. 3 is a cross sectional view along line 3—3 of FIG. 1.

FIG. 3 depicts a view of water regulator 100 along cut line 3—3. Valve element 40 has valve 42 which rotates about shaft 50 which is embedded in interior wall 11 of pipe 10 at shaft first end 51 and passes through pipe 10 at shaft middle 53. Shaft 50 passes through housing 110 and ends in knob 112 which is fixedly engaged to shaft 50. Shaft 50 is locked in the valve open position by bar 30 which is connected to cable 70. Support 55 is fixedly engaged to pipe 10 to support bar 30 which is slidingly engaged with support 55. Spring 80 provides torsion to shaft 50 so that if bar 30 is disengaged from shaft 50, shaft 50 will rotate to a closed position where valve 42 is perpendicular to interior wall 11 of pipe 10. First shield 12 is shown positioned above first impeller 120 and second shield 14 is shown positioned below second impeller 122. Vanes 17 are shown affixed to impeller disks 16. First impeller 120 is rotatably connected to first impeller shaft 15 which passes through pipe 10 and rotatably connects to first meter 114. Second impeller 122 is rotatably connected to second impeller shaft 19 which passes through pipe 10 and rotatably connects to second meter 116. First impeller shaft 15 has first impeller shaft engagement disk 25 which frictionally engages main gear engagement disk 144. Second impeller shaft 19 has second impeller shaft engagement disk 29 which engages main gear engagement disk 144. When vanes 17 are turned by water flowing in pipe 10, first impeller shaft 15 rotates clockwise and second impeller shaft 19 rotates clockwise causing first impeller shaft engagement disk 25 and second impeller shaft engagement disk 29 to cause main gear engagement disk 144 to rotate in a clockwise direction. Main gear 140 is fixedly engaged to main gear engagement disk 144 and therefore, rotates in a counterclockwise direction causing timer gear 148 to rotate in a clockwise direction. Timer gear 148 is calibrated to timer mechanism 134 so that the time of the water flow is determined by the number of revolutions of timer gear 148. When the number of revolutions of timer gear 148 causes timer mechanism 134 to determine that the pre-set amount of time has elapsed, timer mechanism 134 will cause cable 70 to retract which will cause bar 30 to withdraw from shaft 50 allowing shaft 50 to rotate and valve 42 to close. Valve 42 will stay closed until water regulator 100 is reset by manually turning knob 112 until bar 30 engages notch 32 in bar 30 locking valve 42 in the open position. Water will now flow unimpeded by valve 42 until valve 42 is triggered by cable 70 withdrawing bar 30. First impeller shaft 15 rotatably connects to first meter 114. First meter 114 can measure flow between resets of timer mechanism 134. Second impeller shaft 19 is rotatably connected to second meter 116 and can measure continuous elapsed flow. In alternative embodiments, first meter 114 and second meter 116 may be calibrated to measure any flow data desired. When timer gear 148 rotates a lesser number of revolutions than that indicating that the pre-set time has elapsed, water will have stopped flowing in pipe 10. When timer gear 148 stops rotating, timer mechanism 134 will reset to zero so that the next flow of water will begin the process over again. Persons skilled in the art will be familiar with a variety of suitable timer mechanism with automatic reset capability. Main gear engagement disk 144 and main gear 140 are fixedly engaged to main gear shaft 142. Main gear shaft 142 is rotatably connected to housing 110 and rotatably connected to main gear shaft bushing 154. Main gear shaft bushing 154 is rotatably connected to pipe 10. Main gear shaft bushing spring 152 is positioned between interior wall 11 of pipe 10 and main gear shaft bushing head 156. Main gear spring 150 is positioned between main gear 140 and housing 110. Main gear spring 150 and main gear shaft bushing spring 152 maintain main gear 140 and main gear engagement disk 144 in position.

FIG. 4 is a view along cut line 4—4 of FIG. 3 showing a detail view of valve 42, shaft 50, bar 30, support 55, cable 70, cable pulley 20, cable pulley mount 21 and housing 110. Shaft 50 has spring 80 which provides torque to shaft 50 to move to the closed position when bar 30 is removed from shaft 50. Bar spring 60 provides tension to keep bar 30 in position until sufficient pull is provided by cable 30 to remove bar 70 from shaft 50. Bar spring 60 further insures that bar 30 will return to position in shaft 50 when knob 112 is turned to bring notch (not shown) in position for engagement with bar 30. When cable 70 pulls bar 30 out of notch in shaft 50, cable 70 will release tension allowing bar 30 to seek its position. However, bar 30 will only press against the round side of shaft 50 until an operator manually turns knob 112 to turn shaft 50 allowing notch to rotate until bar 30 can slide into position propelled by bar spring 60.

Figure 5:
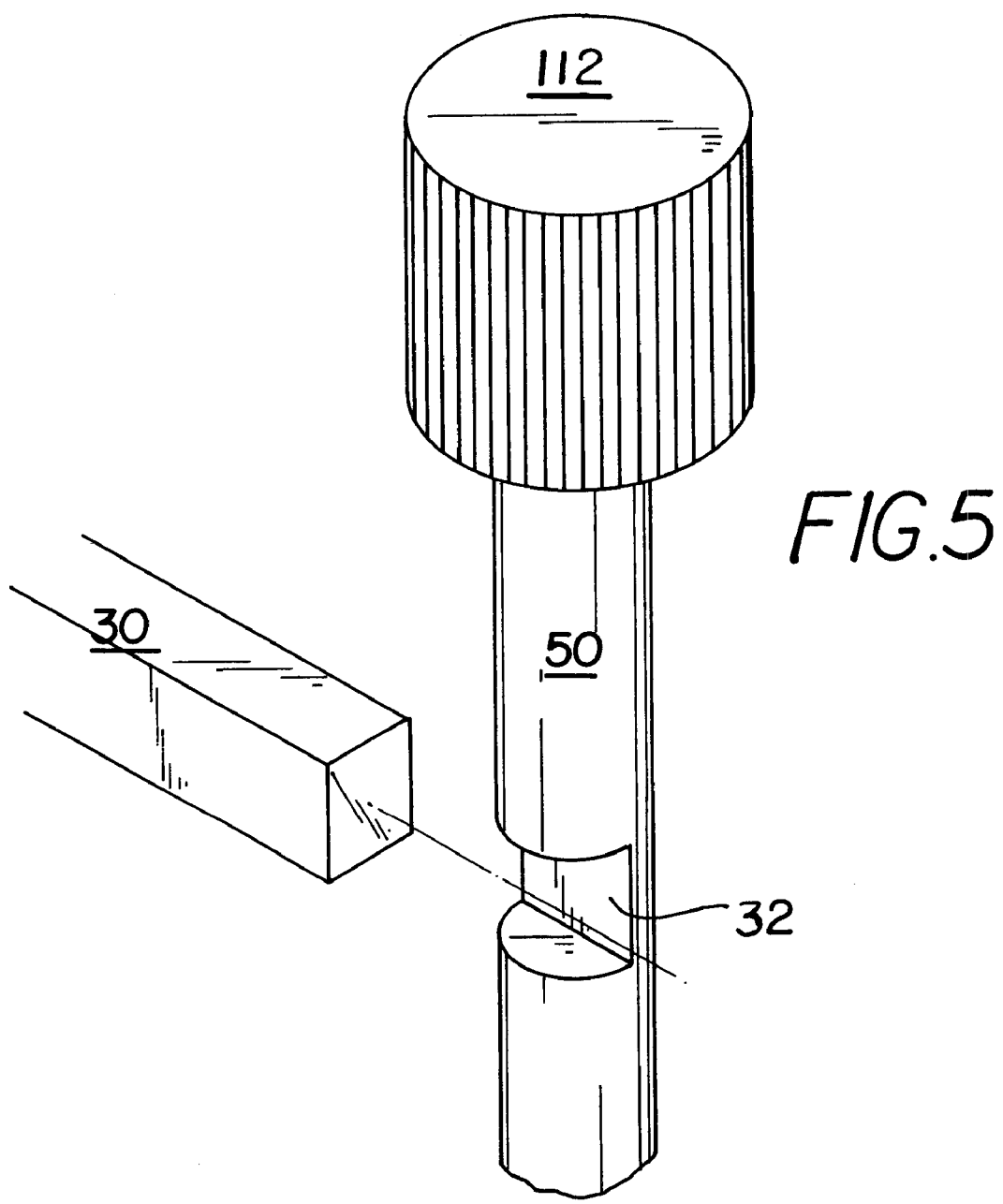
FIG. 5 is a detail view of the manual reset knob.

FIG. 5 is detail view of notch 32, bar 30, shaft 50 and knob 112 showing the direction of engagement of bar 30 in shaft 50.

Figure 6:
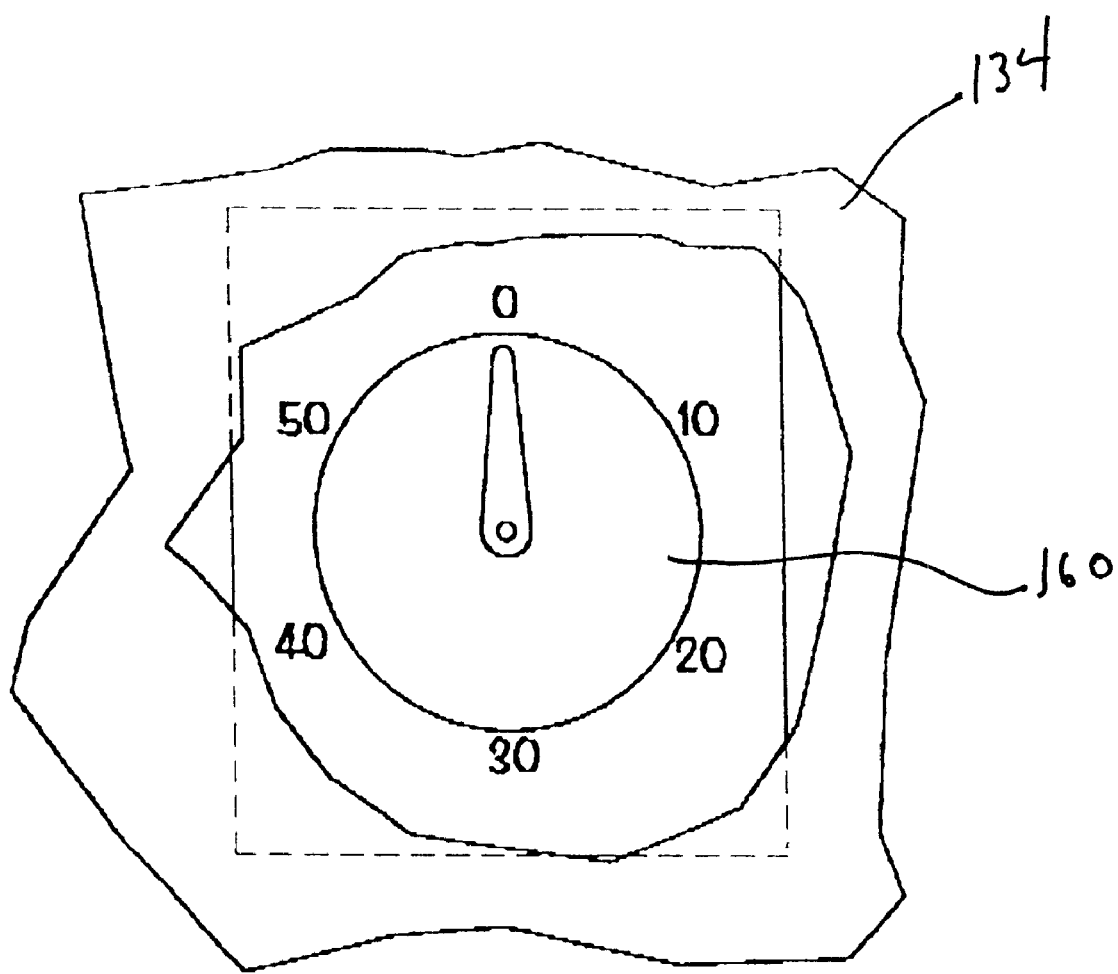
FIG. 6 is an interior view of the timing device.

FIG. 6 is an interior view of timer mechanism 134 showing timer gauge setting 160. Gauge setting 160 can be set to any time up to one hour and when water flow exceeds that time set on timer gauge setting 160, cable 70 will cause bar 30 to withdraw from shaft 50 as shown above.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

I claim:

1. An apparatus for monitoring and regulating the flow of liquid in a pipe comprising:

a support fixedly connected to the pipe;

a control shaft rotatably engaged to said pipe and said support;

a valve fixedly engaged to said control shaft;

a first impeller fixedly engaged to a first impeller shaft rotatably connected through the pipe to a first meter;

a second impeller fixedly engaged to a second impeller shaft rotatably connected through the pipe to a second meter;

a bar slidingly engaged in said support;

a cable fixedly connected to said bar;

a timer mechanism fixedly connected to said cable and to a timing gear;

a main gear engaged with said timing gear and fixedly connected to a main gear shaft and a main gear engagement disk;

a first impeller shaft disk fixedly connected to said first impeller shaft and engaged with said main gear engagement disk;

a second impeller shaft disk fixedly connected to said second impeller shaft and engaged with said main gear engagement disk; and wherein rotation of the first impeller shaft and the second impeller shaft causes the main gear to rotate and create tension in the cable thereby actuating the bar and closing the valve so that the flow of fluid within the pipe is stopped.

2. The apparatus of claim 1 further comprising:

a cable pulley mount fixedly engaged to the support; and a cable pulley rotatably engaged to said cable pulley support.

3. The apparatus of claim 1 further comprising a main gear shaft bushing rotatably connected to the pipe.

4. The apparatus of claim 3 further comprising a main gear shaft bushing spring engaging the main gear bushing and the pipe.

5. The apparatus of claim 1 further comprising a main gear spring engaging the main gear and a housing.

6. The apparatus of claim 1 further comprising a knob fixedly engaged to said control shaft.

7. The apparatus of claim 1 further comprising a housing which protects the apparatus from the weather and external elements.

8. The apparatus of claim 1 further comprising a main spring engaging the main shaft and the pipe.

9. The first impeller of claim 1 further comprising:

a first impeller disk; and a plurality of vanes fixedly engaged to the first impeller disk.

10. The second impeller of claim 1 further comprising:

a second impeller disk; and a plurality of vanes fixedly engaged to the second impeller disk.

11. The apparatus of claim 1 further comprising:

a first shield fixedly engaged to the pipe;

a second shield fixedly engaged to the pipe; and wherein the first shield and the second shield divert the flow of the fluid in the pipe over a plurality of vanes.

* * * * *